United States Patent
Wojcik et al.

(10) Patent No.: US 10,914,557 B2
(45) Date of Patent: Feb. 9, 2021

(54) METHOD, DEVICE, AND SYSTEM FOR MANAGING A FORMATION OF ELECTRONICALLY-EMBEDDED INTELLIGENT SHIELDS

(71) Applicants: MOTOROLA SOLUTIONS, INC, Chicago, IL (US); Wojciech Wojcik, Cracow (PL); Mariusz Wawrowski, Wawrzenczyce (PL)

(72) Inventors: Wojciech Wojcik, Cracow (PL); Mariusz Wawrowski, Wawrzenczyce (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/334,847

(22) PCT Filed: Dec. 9, 2016

(86) PCT No.: PCT/PL2016/050056
§ 371 (c)(1),
(2) Date: Mar. 20, 2019

(87) PCT Pub. No.: WO2018/106131
PCT Pub. Date: Jun. 14, 2018

(65) Prior Publication Data
US 2020/0021666 A1    Jan. 16, 2020

(51) Int. Cl.
*F41H 5/08* (2006.01)
*H04W 4/90* (2018.01)
(Continued)

(52) U.S. Cl.
CPC ............... *F41H 5/08* (2013.01); *H04L 67/18* (2013.01); *H04L 67/306* (2013.01); *H04W 4/90* (2018.02); *H04W 4/02* (2013.01)

(58) Field of Classification Search
CPC .. F41H 5/08; H04W 4/90; H04W 4/02; H04L 67/18; H04L 67/306; A42B 3/046;
(Continued)

(56) References Cited

U.S. PATENT DOCUMENTS

| 4,511,886 A | 4/1985 | Rodriguez |
| 5,652,570 A | 7/1997 | Lepkofker |

(Continued)

FOREIGN PATENT DOCUMENTS

| EP | 0437341 A | 7/1991 |
| JP | 2000311299 | 11/2000 |

OTHER PUBLICATIONS

The International Search Report and the Written Opinion corresponding serial No. PCT/PL2016/050056 filed Dec. 9, 2016, all pages.

*Primary Examiner* — Binh Kien Tieu (57) ABSTRACT

A process for managing a formation of intelligent electronically-embedded intelligent shields includes first receiving, from a plurality of primary officer and intelligent shield pairs, first location information and pressure information measured at a pressure sensor coupled to the intelligent shield and indicative of a pressure being applied to a front and/or rear face of the intelligent shield. The received pressure information is then compared to a threshold pressure value to identify those shields exceeding the threshold. Then a particular secondary support officer is identified for aiding the particular primary officer, after which either a redeployment message is transmitted to the particular secondary support officer or an indication instruction is transmitted to the intelligent shield in the particular primary officer and intelligent shield pair.

20 Claims, 5 Drawing Sheets

(51) Int. Cl.
*H04L 29/08* (2006.01)
*H04W 4/02* (2018.01)

(58) Field of Classification Search
CPC ....... A61B 5/103; A61B 5/114; A61B 5/4064; A61B 5/6803; A61B 2503/10; A61B 5/11; A61B 5/7257; A61B 5/747; G08B 25/016; G08B 21/0269; G08B 21/0202
USPC .......... 455/73, 92, 100, 456.1, 456.3, 456.5, 455/460; 340/13.24, 539.13, 539.11, 340/539.15, 539.21, 573.1; 600/300, 587, 600/595; 2/414
See application file for complete search history.

(56) References Cited

U.S. PATENT DOCUMENTS

| | | | |
|---|---|---|---|
| 6,926,233 B1 | 8/2005 | Corcoran, III | |
| 7,980,720 B2 | 7/2011 | Shemwell et al. | |
| 8,423,066 B2 | 4/2013 | Deluca | |
| 9,311,801 B2* | 4/2016 | Cholhan | G08B 21/02 |
| 9,554,607 B2* | 1/2017 | Mack | G01L 1/26 |
| 10,105,075 B2* | 10/2018 | Sanghera | A61B 5/0472 |
| 2006/0074338 A1* | 4/2006 | Greenwald | A61B 5/0002 600/549 |
| 2011/0235467 A1* | 9/2011 | Bostick | A01M 29/16 367/139 |
| 2013/0060168 A1* | 3/2013 | Chu | A61B 5/6803 600/595 |
| 2014/0244775 A1 | 8/2014 | Hull et al. | |
| 2014/0292510 A1 | 10/2014 | Cholhan et al. | |
| 2014/0364772 A1* | 12/2014 | Howard | A61B 5/6803 600/595 |
| 2018/0324410 A1* | 11/2018 | Roine | H04N 13/189 |
| 2020/0312110 A1* | 10/2020 | Kaindl | A61B 5/6804 |
| 2020/0355463 A1* | 11/2020 | Piccioni | A45F 5/021 |

* cited by examiner

METHOD, DEVICE, AND SYSTEM FOR MANAGING A FORMATION OF ELECTRONICALLY-EMBEDDED INTELLIGENT SHIELDS

BACKGROUND OF THE INVENTION

Many public safety operations may experience situations in which large numbers of participants in a crowd need to be monitored and managed through proactive and reactive public safety deployments. Such crowd management techniques may include line formations, loud noises or distractions, or non-lethal weapons such as chemical controls or electronic weaponry, for example. In the case of line formations, public safety officers may be equipped with some form of protective shield and facemask in order to protect them and to help maintain the line formation. Maintenance of the line formation is very important as any break in the line renders the remainder of the line and any other people or property behind the line at risk.

However, given the noise and activity in those situations in which line formations are deployed, it becomes very difficult for line formation members to communicate with one another and to identify current and/or potential future weaknesses in the formation line.

Accordingly, there exists a need for an improved method, device, and system for managing a formation of electronically-embedded intelligent shields.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed is an improved method, device, and system for managing a formation of electronically-embedded intelligent shields.

In one embodiment, a process for managing a formation of intelligent electronically-embedded intelligent shields includes: receiving, at a computing device, from each of a plurality of primary officer and intelligent shield pairs, first location information associated with the primary officer and intelligent shield pair and pressure information measured at a pressure sensor coupled to the intelligent shield and indicative of a pressure being applied to a front and/or rear face of the intelligent shield; comparing, by the computing device and for each of the primary officer and intelligent shield pairs, received pressure information to a threshold pressure value stored at the computing device and identifying, by the computing device as a result of the comparing, a particular primary officer and intelligent shield pair providing a particular received pressure information exceeding the threshold pressure value, and responsively: identifying, by the computing device via second location information provided via a plurality of secondary support officer and mobile radio computing device pairs, a particular secondary support officer to aid the particular primary officer; and one or both of (i) causing, by the computing device, a redeployment message to be transmitted to the particular secondary support officer via a particular mobile radio computing device paired with the particular secondary support officer instructing the particular secondary support officer to aid the particular primary officer and including the location information associated with the particular primary officer, and (ii) causing, by the computing device, an indication instruction to be transmitted to the intelligent shield in the particular primary officer and intelligent shield pair instructing the intelligent shield to activate an externally perceivable indication to aid the particular secondary support officer in locating a location of the primary officer and intelligent shield pair.

In a further embodiment, a computing device for triggering and propagating of a covert mode status change includes: one or more transceivers; a data store; and one or more electronic processors configured to: receive, via the one or more transceivers, from each of a plurality of primary officer and intelligent shield pairs, first location information associated with the primary officer and intelligent shield pair and pressure information measured at a pressure sensor coupled to the intelligent shield and indicative of a pressure being applied to a front and/or rear face of the intelligent shield; compare, for each of the primary officer and intelligent shield pairs, received pressure information to a threshold pressure value stored at the computing device and identifying, by the computing device as a result of the comparing, a particular primary officer and intelligent shield pair providing a particular received pressure information exceeding the threshold pressure value, and responsively: identify, via second location information provided via a plurality of secondary support officer and mobile radio computing device pairs, a particular secondary support officer to aid the particular primary officer; and one or both of (i) cause a redeployment message to be transmitted, via the one or more transceivers, to the particular secondary support officer via a particular mobile radio computing device paired with the particular secondary support officer instructing the particular secondary support officer to aid the particular primary officer and including the location information associated with the particular primary officer, and (ii) cause, via the one or more transceivers, an indication instruction to be transmitted to the intelligent shield in the particular primary officer and intelligent shield pair instructing the intelligent shield to activate an externally perceivable indication to aid the particular secondary support officer in locating a location of the primary officer and intelligent shield pair.

Each of the above-mentioned embodiments will be discussed in more detail below, starting with example device and network architectures of the system in which the embodiments may be practiced, followed by an illustration of processing steps for managing a formation of electronically-embedded intelligent shields. Further advantages and features consistent with this disclosure will be set forth in the following detailed description, with reference to the figures.

1. DEVICE AND SYSTEM STRUCTURE

Figure 1:
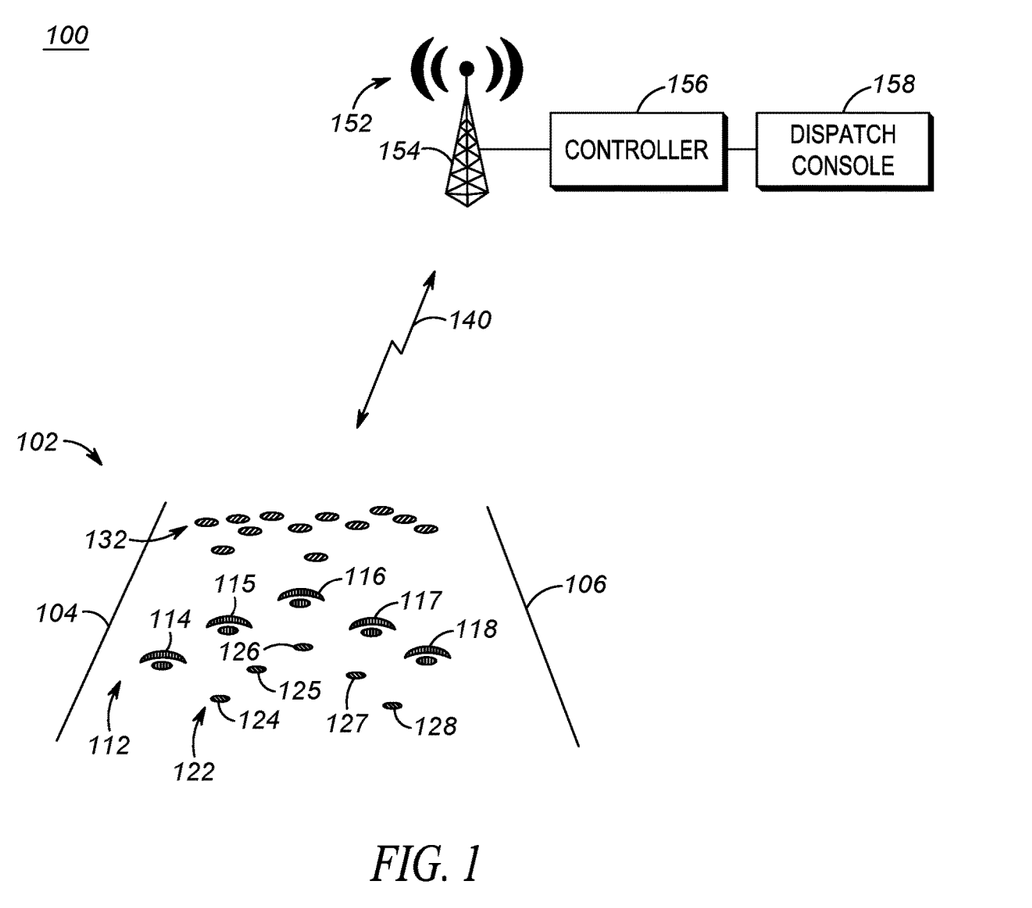
FIG. 1 is a system diagram illustrating a crowd control technique including a primary officer formation line where each primary officer is equipped with an intelligent shield, secondary support officers where each secondary support officer is equipped with a mobile radio computing device, a crowd to be managed, and an optional back-end support infrastructure in accordance with some embodiments.
Figure 2:
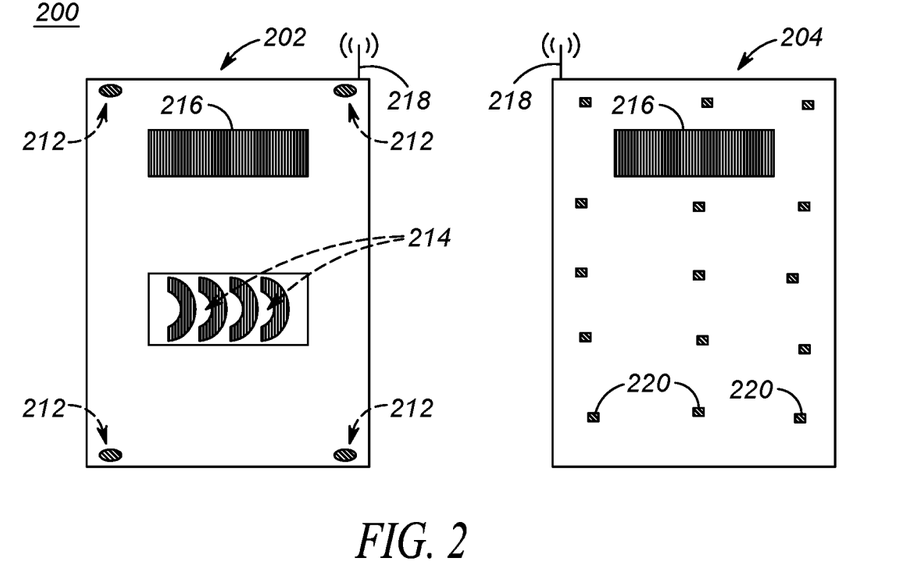
FIG. 2 is a device diagram illustrating a primary officer-equipped first intelligent shield in accordance with some embodiments.
Figure 3:
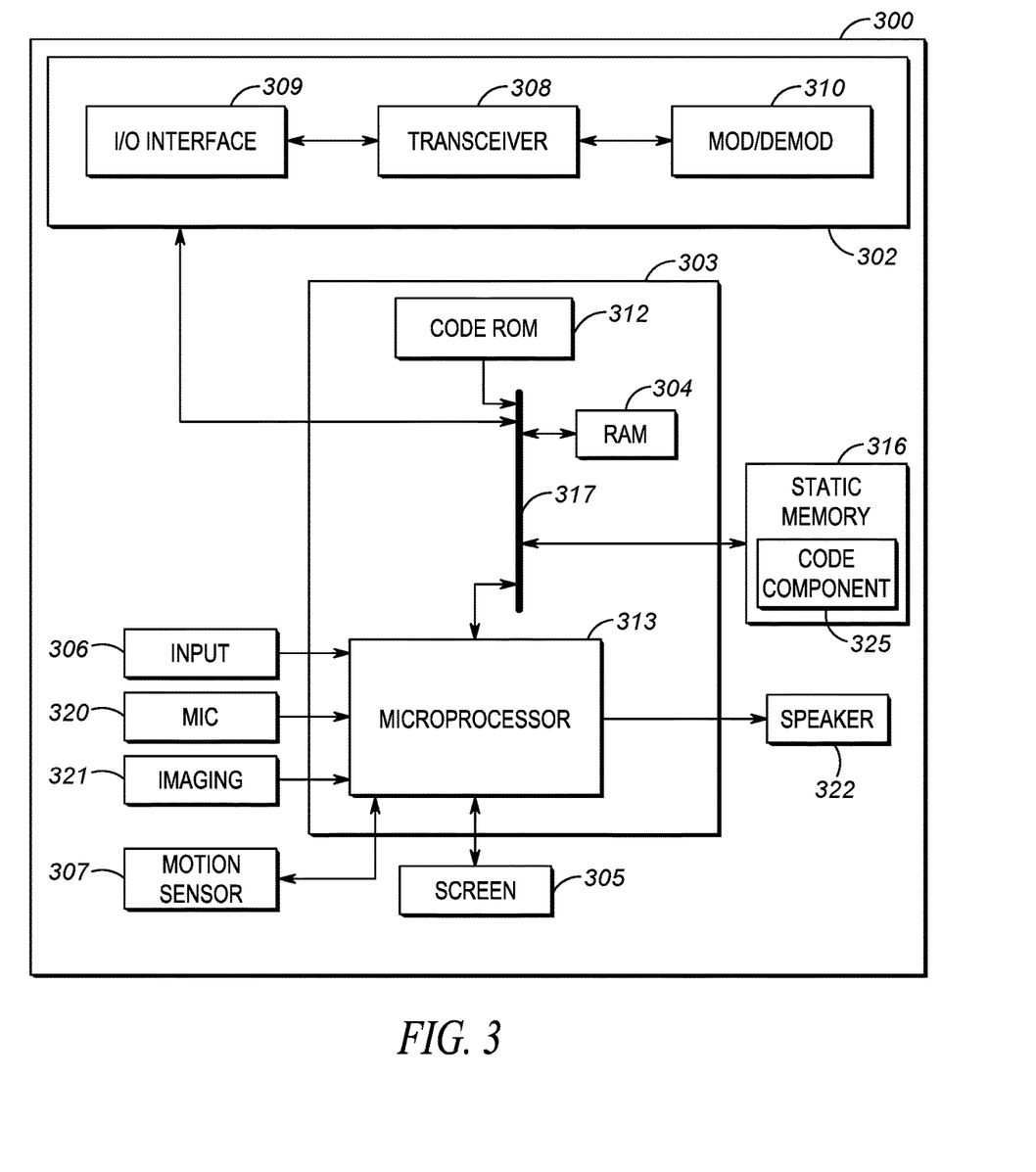
FIG. 3 is a device diagram showing a device structure of an electronic computing device in accordance with some embodiments.

Referring now to the drawings, and in particular FIGS. 1-3, an example system architecture and example computing devices are disclosed for enabling crowd management using a formation of electronically-embedded intelligent shields. FIG. 1 sets forth an example system diagram illustrating a crowd control technique including a primary officer formation line where each primary officer is equipped with an intelligent shield, secondary support officers each equipped with a mobile radio computing device, a crowd under control, and a back-end support infrastructure in accordance with some embodiments. FIG. 2 is a device diagram illustrating a primary officer-equipped intelligent shield deployed in the system of FIG. 1. And FIG. 3 is a device diagram illustrating an electronic computing device structure for executing the steps of FIG. 4.

As set forth in FIG. 1, a system 100 for managing a formation of electronically-embedded intelligent shields includes an incident scene 102 having borders 104, 106, between which a plurality of primary officers 112 equipped with intelligent shields are deployed and at which a plurality of secondary support officers 122 equipped with mobile radio computing devices are deployed to assist the primary officers 112. Although five primary officers 112, including primary officers 114, 115, 116, 117, 118, are illustrated in FIG. 1, more or less than five primary officers 112 could be deployed in alternate scenarios. Furthermore, although an equal number of five secondary support officers 122, including secondary support officers 124, 125, 126, 127, 128, are illustrated in FIG. 1, more or less than five secondary support officers 122 could be deployed in alternate scenarios. The primary officers 112 and secondary support officers 122 are illustrated as managing a crowd 132 of approximately twelve people. Although FIG. 1 will be described with respect to human primary officers 112 and secondary support officers 122, in other embodiments, partially or fully automated drones could take the place of the human primary officers 112 and secondary support officers 122.

While a mobile radio computing device is described herein as accompanying each of the primary officers 112 (either integrated in the intelligent shield accompanying each primary officer 112, in a mobile radio computing device separately equipped on a body of the primary officer, or some combination thereof) and accompanying each of the secondary support officers 122, in other embodiments, other types of computing devices could be used, including but not limited to a cellular phone, a tablet computer, a clothing-integrated computing device, a pair of smart glasses, a smart watch, and any other computing device capable of being disposed on or carried by a police officer or integrated within the intelligent shield, and wirelessly communicating with other computing devices in an ad-hoc or infrastructure manner. Furthermore, while primary and secondary support officers are generally described herein as police officers, other types of public safety personnel could take advantage of the disclosed embodiments as well, including but not limited to, national park officers, medics, special weapons and tactics personnel, evidence technicians, and military officers, among other possibilities.

Infrastructure RAN 152 provides infrastructure-supported communications to the mobile radio computing devices of FIG. 1, and may implement over wireless link(s) 140 a conventional or trunked LMR standard or protocol such as DMR, a P25 standard defined by the APCO, TETRA, or other LMR radio protocols or standards. In other embodiments, infrastructure RAN 152 may additionally or alternatively implement over wireless link(s) 140 an LTE protocol including MBMS, an OMA-PoC standard, a VoIP standard, or a PoIP standard. In still further embodiments, infrastructure RAN 152 may additionally or alternatively implement over wireless link(s) 140 a Wi-Fi protocol perhaps in accordance with an IEEE 802.11 standard (e.g., 802.11a, 802.11b, 802.11g) or a WiMAX protocol perhaps operating in accordance with an IEEE 802.16 standard. Other types of wireless protocols could be implemented as well. The infrastructure RAN 152 is illustrated in FIG. 1 as providing coverage for the mobile radio computing devices equipped with the primary officers 112 and/or secondary support officers 122 via a single fixed terminal 154 coupled to a controller 156 (e.g., radio controller, call controller, PTT server, zone controller, MME, BSC, MSC, site controller, Push-to-Talk controller, or other network device) and including a dispatch console 158 operated by a dispatcher. The controller 156 may additionally or alternatively operate as a back-end processing electronic computing device consistent with the remainder of this disclosure managing a formation of electronically-embedded intelligent shields.

FIG. 2 sets forth an electronically-embedded intelligent shield example device structure 200 that may be implemented for each of the electronically-embedded intelligent shields equipped with each of the primary officers 112 of FIG. 1. The device structure 200 illustrated in FIG. 2 includes a rear-facing view 202 that faces the primary officer 112 and a front-facing view 204 that faces the crowd 132.

The rear-facing view 202 includes a plurality of orientation sensors 212, a plurality of pressure sensors 214 deployed on a rear-facing arm band via which the primary officers 112 may support the device structure 200, and a transparent window 216 through which a primary officer 112 may safely view what is occurring in the crowd 132. The plurality of orientation sensors 212, although illustrated in FIG. 2 only via the rear-facing view 202, may be deployed at various other locations throughout the intelligent shield device structure 200 sufficient to detect an orientation of the intelligent shield and distinguish between a vertical orientation and a substantially non-vertical orientation (e.g., >45° from vertical). Although four orientation sensors 212 are illustrated as being disposed at each corner of the rectangular-shaped shield device structure 200, in other embodiments, more or less orientation sensors could be disposed and at different structural locations of the intelligent shield. Each of the orientation sensors 212 may include a gyroscope. A gyroscope is a device for measuring or maintaining orientation, based on the principles of conservation of angular momentum. One type of gyroscope, a microelectromechanical system (MEMS) based gyroscope, uses lithographically constructed versions of one or more of a tuning fork, a vibrating wheel, or resonant solid to measure orientation. Other types of gyroscopes and other types of orientation sensors could be used as well.

The rear-facing view 202 further includes a plurality of pressure sensors 214 deployed on a rear-facing arm band via which the primary officers 112 support the device structure 200. The plurality of pressure sensors 214 may be deployed at various locations throughout the arm band sufficient to detect a pressure being applied to the primary officer 112 that is supporting the device structure 200. Although four pressure sensors 214 are illustrated as being disposed at each of four arm band supports of the rectangular-shaped device structure 200, in other embodiments, more or less pressure sensors could be disposed and at more, less, or different types of device structure 200 supports.

Each of the pressure sensors 214 may include an electrical, ultrasonic, optical, or hydraulic pressure signal gauge that generates an electrical signal that varies in dependence upon the magnitude the pressure applied to the gauge. For example, the sensor may include a strain gauge, a load cell, or a displacement-responsive transducer. In regard to strain gauges in particular, the sensor may be a foil strain gauge, a thin film strain gauge, or a wire strain gauge.

The foil strain gauge consists of a metal foil pattern mounted on an insulating backing or carrier and constructed by bonding a sheet of thin rolled metal foil on a backing sheet. The thin-film strain gauge produced by sputtering or evaporating thin films of metals or alloys either directly onto the elastic element or onto a small metallic substrate for subsequent attachment to the intelligent shield. Additionally or alternatively, a wire strain gauge could be used, that typically consists of a wire approximately 20-30 μm in diameter and bonded to a substrate using ceramic materials.

In any event, and regardless of type, the electrical signal ultimately generated by the pressure sensor preferably encodes an absolute (or relative) sensed pressure into an electrical signal representative of an applied force (e.g., in Newtons or millimeters displacement, or some other unit). In other embodiments, the strain or other value measured at the pressure gauge may be converted to a pressure applied in Newtons or directly used to compare to a strain threshold (as another example of a pressure threshold) at a computing device such as at the intelligent shield itself, at a mobile radio computing device coupled to the primary officer and communicatively coupled to the intelligent shield, or at a back-end controller device, among other possibilities.

The front-facing view 204 may include a plurality of additional pressure sensors 220 deployed on a front facing surface of the device structure 200 facing the crowd 132. The plurality of pressure sensors 220 may be deployed at various locations throughout the front facing surface to detect a pressure being applied to the intelligent shield by the crowd 132. Although fifteen pressure sensors 220 are illustrated as being disposed in a matrix-like form factor on the front face of the rectangular-shaped device structure 200, in other embodiments, more or less pressure sensors could be disposed and in different arrangements. Each of the pressure sensors 220 may be the same or similar to the pressure sensors 214 set forth above, or may be a different type of pressure sensor than those disposed on the rear-facing view 202.

Although not separately illustrated in FIG. 2, each intelligent shield device structure 200 may include an integrated computing device same or similar to that set forth below with respect to FIG. 3, and each intelligent shield device structure 200 may include an antenna 218 for communicating with a separate mobile radio computing device carried by each primary officer 112 via a short-range radio (such as a Bluetooth transceiver, a Wi-Fi transceiver, or a Zigbee transceiver) or for directly communicating with an infrastructure RAN 152 via a longer-range radio (such as an LMR standard or protocol such as DMR or an LTE protocol).

Referring to FIG. 3, a schematic diagram illustrates an electronic computing device 300 according to some embodiments of the present disclosure. Electronic computing device 300 may be, for example, integrated in each intelligent shield carried by primary officers 112, may be embodied in a separate mobile radio computing device carried by each primary officer 112, may be embodied in a separate mobile radio computing device carried by each secondary support officer 122, may be embodied in the infrastructure controller 156, or may be embodied in a distributed computing system across one or more of the foregoing. As shown in FIG. 3, electronic computing device 300 includes a communications unit 302 coupled to a common data and address bus 317 of a processing unit 303. The electronic computing device 300 may also include an input unit (e.g., keypad, pointing device, etc.) 306 and a display screen 305, each coupled to be in communication with the processing unit 303. In some examples, electronic computing device 300 may also include a motion sensor 307.

In some embodiments, a microphone 320 may capture audio from a user that is further vocoded by processing unit 303 and transmitted as voice stream data by communication unit 302 to other mobile or portable radios and/or other devices, and a communications speaker 322 may reproduce audio that is decoded from voice streams of voice calls received from other mobile or portable radios and/or from an infrastructure device via the communications unit 302. An imaging device 321 may provide images and/or video of an area in a field of view of the electronic computing device for further processing by the processing unit 303.

The processing unit 303 may include a code Read Only Memory (ROM) 312 coupled to the common data and address bus 317 for storing data for initializing system components. The processing unit 303 may further include an electronic microprocessor 313 coupled, by the common data and address bus 317, to a Random Access Memory (RAM) 304 and a static memory 316.

The motion sensor 307 may include one or more movement sensors (such as a gyroscope) that may periodically or intermittently provide to the microprocessor 313 indications of orientation, direction, steps, acceleration, and/or speed, perhaps accompanying other additional information.

The communications unit 302 may include one or more wired or wireless input/output (I/O) interfaces 309 that are configurable to communicate with intelligent shields, with an infrastructure RAN, with other electronic computing device, with mobile radio computing devices, with other mobile or portable radios, and/or with other types of computing devices.

The communications unit 302 may include one or more wireless transceivers 308, such as a DMR transceiver, a P25 transceiver, a Bluetooth transceiver, a Wi-Fi transceiver perhaps operating in accordance with an IEEE 802.11 standard (e.g., 802.11a, 802.11b, 802.11g), a WiMAX transceiver perhaps operating in accordance with an IEEE 802.16 standard, an LTE transceiver, and/or other similar type of wireless transceiver configurable to communicate via a wireless radio network. The communications unit 302 may additionally or alternatively include one or more wireline transceivers 308, such as an Ethernet transceiver, a Universal Serial Bus (USB) transceiver, or similar transceiver configurable to communicate via a twisted pair wire, a coaxial cable, a fiber-optic link, an audio jack, or a similar physical connection to a wireline network. The transceiver 308 is also coupled to a combined modulator/demodulator 310.

The microprocessor 313 has ports for coupling to the input unit 306, the motion sensor 307, the microphone unit 320, the imaging device 321, and the display screen 305 and speaker 322. Static memory 316 may store operating code for the microprocessor 313 that, when executed, performs one or more of the steps of FIG. 4 and accompanying text for managing a formation of electronically-embedded intelligent shields. Static memory 316 may also store, permanently or temporarily, a static threshold pressure rule and a maximum pressure threshold value and/or individualized threshold pressure rules and individualized maximum pressure threshold values (including both instantaneous and time-based rules and values) as disclosed herein.

Static memory 316 may comprise, for example, a hard-disk drive (HDD), an optical disk drive such as a compact disk (CD) drive or digital versatile disk (DVD) drive, a solid state drive (SSD), a tape drive, a flash memory drive, or a tape drive, to name a few.

2. PROCESSES FOR MANAGING A FORMATION OF ELECTRONICALLY-EMBEDDED INTELLIGENT SHIELDS

Figure 4:
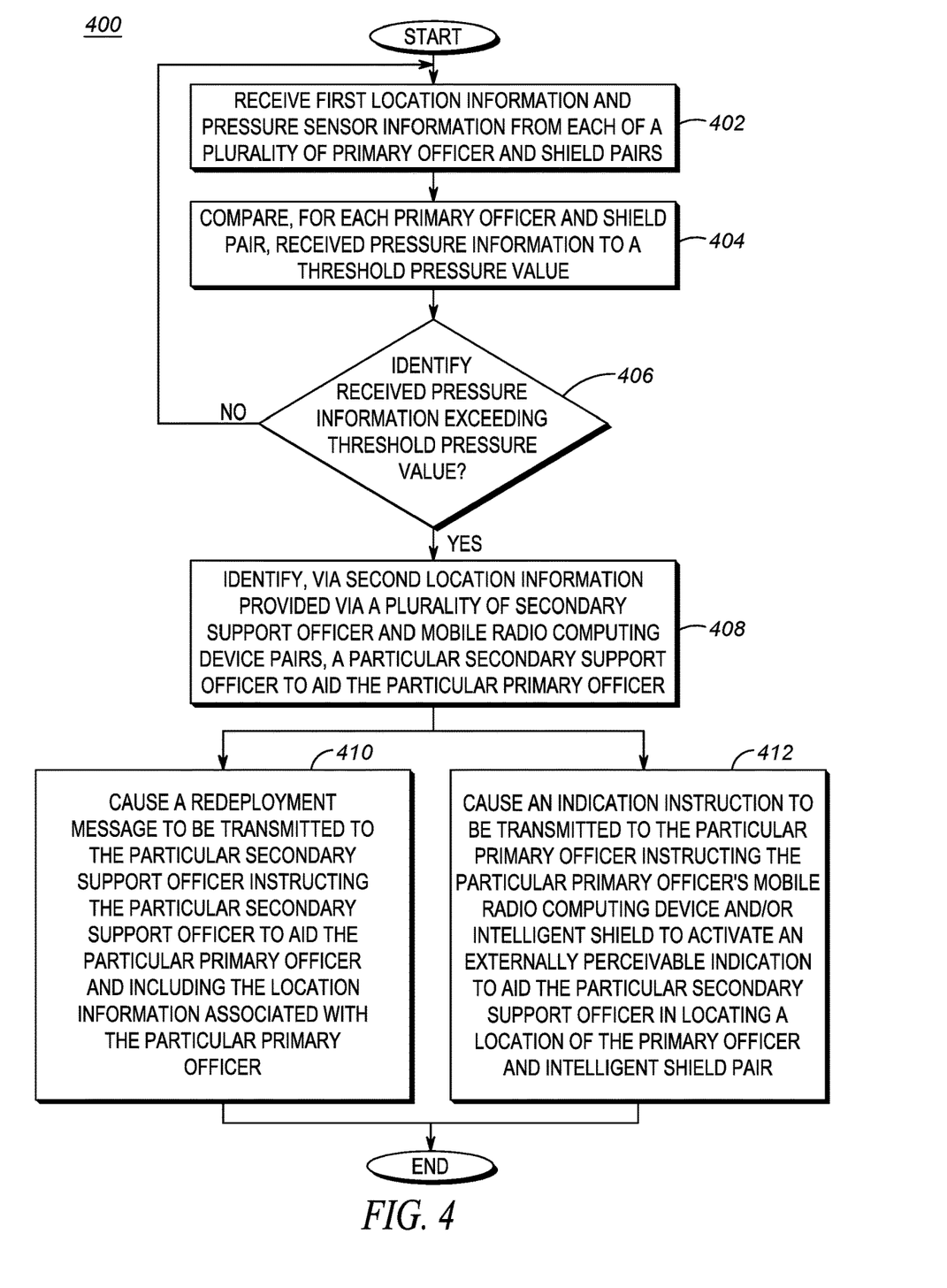
FIG. 4 illustrates a flow chart setting forth process steps for managing a formation of electronically-embedded intelligent shields in accordance with some embodiments.
Figure 5A:
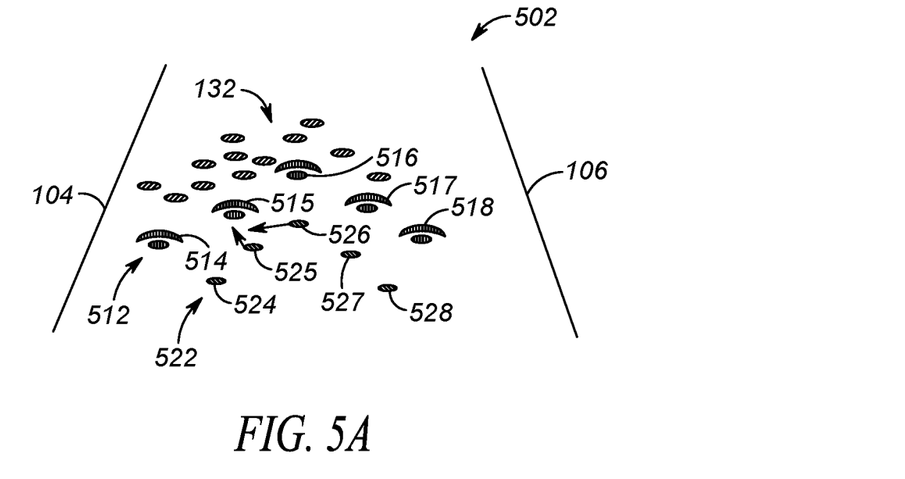
FIGS. 5A and 5B illustrate follow-on system diagrams illustrating how secondary support officers may be re-deployed to aid primary officers consistent with the flow chart of FIG. 4 in accordance with some embodiments.
Figure 5B:
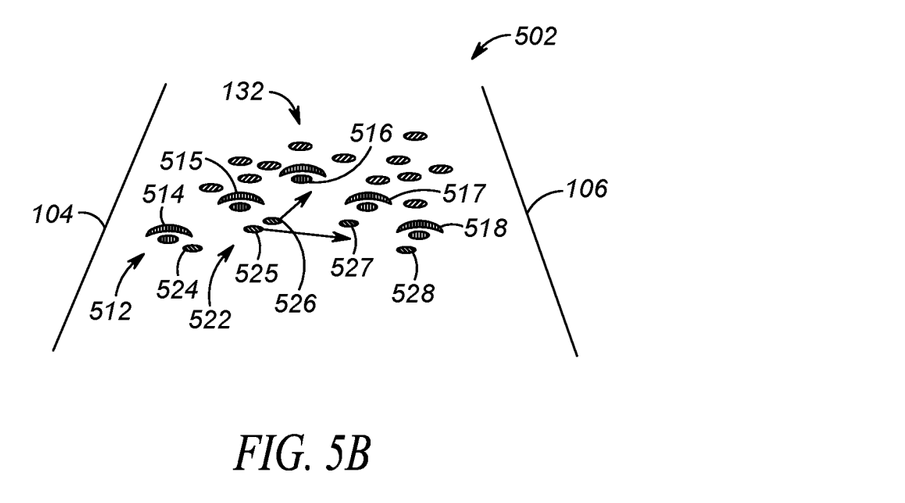

Turning now to FIGS. 4-5B, a flow chart in FIG. 4 sets forth a process 400 for managing a formation of electronically-embedded intelligent shields, and FIGS. 5A and 5B illustrate how the management of such intelligent shield formations via process 400 may be reflected in the system 100 of FIG. 1. Process 400 may be executed at an electronic computing device same or similar to the electronic computing device 300 of FIG. 3 disposed at the controller 156, at any one or more of the intelligent shields equipped at the primary officers 112, at any or more mobile radio computing devices equipped at the primary officers 112, at any or more of the mobile radio computing devices equipped at the secondary support officers 122, or elsewhere. Other devices communicating with the one or more electronic computing device executing process 400 may be pre-configured with the identity of the electronic computing device executing process 400 and may communicate with the electronic computing device via an ad-hoc or infrastructure network, or may perform a discovery process to locate the electronic computing device executing process 400. Other possibilities exist as well.

Process 400 begins at step 402, where the electronic computing device receives first location information and pressure sensor information from each of a plurality of primary officer and intelligent shield pairs, such as from primary officers 112 of FIG. 1. The location information received from each primary officer 112 and intelligent shield pair may be received directly from an intelligent shield with an integrated mobile radio computing device (and location determination logic), or may be received from a mobile radio computing device associated with and carried by each primary officer 112. The location information may be received at the electronic computing device via an infrastructure network such as RAN 152 of FIG. 1 or via one or more of a personal area network (PAN), vehicle area network (VAN), local area network (LAN), ad-hoc network (AHN), or disruption tolerant network (DTN).

The location information may be, for example, global positioning system (GPS) coordinates obtained via a GPS receiver circuit and transmitted to the electronic computing device, along with an identifier identifying the primary officer, the intelligent shield, and/or the mobile radio computing device. Other methods of determining absolute or relative location, such as triangulation, may be used as well.

Additionally or alternatively, the first location information may include a formation position identifier that identifies a position of the primary officer and intelligent shield pair in a formation of a plurality of primary officer and intelligent shield pairs. For example, and with reference to the formation of primary officers 112 in FIG. 1, a first primary officer 114 and intelligent shield pair may transmit an electronic representation of formation position "1", a second primary officer 115 and intelligent shield pair may transmit an electronic representation of formation position "2", a third primary officer 116 and intelligent shield pair may transmit an electronic representation of formation position "3", a fourth primary officer 117 and intelligent shield pair may transmit an electronic representation of formation position "4", and a fifth primary officer 118 and intelligent shield pair may transmit an electronic representation of formation position "5". Other methods of identifying positions within a known formation are possible as well.

In addition to first location information, the electronic computing device receives pressure sensor information from each intelligent shield of each of the plurality of primary officer and intelligent shield pairs. The pressure sensor information may be received directly from an intelligent shield with integrated computing device (and location determination logic), or may be received from a mobile radio computing device associated with and carried by each primary officer and intelligent shield pair (which itself receives the pressure information directly from the intelligent shield via a wired or wireless short range communication link). As set forth earlier, the pressure sensor information may be in the form of an absolute or relative pressure measurement measured in Newtons, in distance displacement, in electrical resistance, in electrical conductance, or in some other pressure measurement unit, and is generated as a function of a pressure applied to pressure sensors on a front-face of the intelligent shield, a pressure applied to pressure sensors on a rear-face/arm band of the intelligent shield, or some combination thereof.

The location and pressure information received at step 402 (and the identity of the primary officer and intelligent shield pair that generated the information) and may additionally be saved in a local or remote storage for subsequent access in re-creating pressure flows throughout the incident.

FIGS. 5A and 5B illustrate follow-on system diagrams illustrating how secondary support officers may be re-deployed to aid primary officer and intelligent shield pairs consistent with process 400 of FIG. 4. FIGS. 5A and 5B illustrate a crowd 132 being monitored and/or managed by a formation line of primary officers 512 including first primary officer 514, second primary officer 515, third primary officer 516, fourth primary officer 517, and fifth primary officer 518. Secondary support officers 522 include a first secondary support officer 524, a second secondary support officer 525, a third secondary support officer 526, and fourth secondary support officer 527, and a fifth secondary support officer 528.

Referencing FIG. 5A in particular, as a crowd 132 at an incident scene 502 moves towards a formation line of primary officers 512, a new and/or additional pressure may be applied to a particular intelligent shield of a primary officer 515 in the second position of the formation line. As the pressure on the particular intelligent shield of the primary officer 515 begins changing (increasing in this case), the particular intelligent shield may itself begin transmitting updated pressure sensor readings (e.g., the particular intelligent shield may not transmit pressure sensor readings until a change in pressure is sensed, or may periodically transmit nominal pressure readings notwithstanding any sensed change) to the electronic computing device executing process 400 directly, or via a short-range transmission to a mobile radio computing device carried by the primary officer 515, which may then forward the pressure sensor readings to the to the electronic computing device executing process 400. Other primary officers 514, 516, 517, and 518 may also periodically transmit nominal pressure sensor readings, or may only transmit pressure readings when a change in pressure is sensed. In some embodiments, the intelligent shield and/or primary officer's mobile radio computing device may filter out sensed pressure changes associated with a projectile (instead of crowd pressure) that lasts less than a projectile threshold period of time of 500 ms, 1 s, or 2 s, for example, such that only sustained changes in pressure associated with crowd pressure are transmitted to the electronic computing device in order to avoid taking premature corrective actions.

Returning to process 400 of FIG. 4, at step 404, the electronic computing device compares, for each primary officer and intelligent shield pair from which pressure sensor information was received at step 402, received pressure sensor information to a threshold pressure value. The electronic computing device may apply a same or similar projectile filtering process (assuming it is not applied at the primary officer and intelligent shield pair as set forth above) on received pressure information in a similar manner to that set forth above in order to similarly avoid taking premature corrective actions.

The threshold pressure value used at step 404 may be set by a pre-determined rule and may be a static pressure value generally indicative of 60-90% of a generalized maximum pressure that a primary officer can absorb without breaking formation (e.g., 600-900 N instantaneous or 28000-36000 Ns), or may be 60-90% of a particular pressure value uniquely tailored to the particular primary officer with which it is associated and/or based on a previously measured maximum pressure that the particular primary officer can absorb without breaking formation (or perhaps calculated based on particular attributes of that particular primary officer, such as weight, age, height, health history, type of intelligent shield, material of intelligent shield, orientation of intelligent shield, type of pressure sensor in intelligent shield, location of pressure sensor(s) in intelligent shield, etc). What percentage of the maximum pressure is used as the threshold may be set by separate pressure threshold rules stored at the electronic computing device. In other embodiments, particular thresholds may be directly set and used (generally or per-officer) without applying separate threshold rules to a maximum pressure values. Other methods are possible as well.

Additionally or alternatively, and in some embodiments, the threshold pressure value may be measured in force over time (Newton seconds). In still further embodiments, a static instantaneous first pressure threshold may be applied to instantaneous pressures (perhaps after being filtered via a short projectile threshold period of time), while a second time-based pressure threshold may additionally be applied to aggregated received pressures over a larger time window on the order of tense of seconds or singles or tens of minutes. Table I sets forth an example maximum pressure matrix for an exemplary three officers.

TABLE I

| Example Maximum Pressure Matrix | | | |
|---|---|---|---|
| Officer/Shield ID | Formation Location | Max Inst. Pressure | Max Pressure/Time |
| Levy | 1 | 720 N | 32000 Ns |
| Smith | 2 | 800 N | 36000 Ns |
| Johnson | 3 | 600 N | 28000 Ns |

Table I above sets forth an example maximum pressure matrix for primary officer and intelligent shield pairs identified by primary officer identifiers Levy, Smith, and Johnson. Smith may be an alphanumeric identifier of the primary officer as set in a particular intelligent shield assigned to an Officer Smith, as set in a particular mobile communications device coupled to and associated with Officer Smith, or may as set in the electronic computing device itself and mapped to some other electronic identifier provided by the intelligent shield and/or mobile communications device transmitting the pressure and location information for Officer Smith, among other possibilities. Officer Smith may be assigned a location of "2" in a line formation of which Levy and Johnson are also members, and which may be transmitted by the intelligent shield or mobile communications device associated with Officer Smith as first location data, or which may be stored at the electronic computing device and set responsive to receiving GPS location information from the intelligent shield or mobile communications device associated with Officer Smith identifying Officer Smith to be in a location "2" of the intended formation. Finally, Table I sets forth both a first maximum instantaneous pressure of 800 N and a second maximum time-based pressure of 36000 Newton seconds (any combination of an aggregated measured pressure over a total time window). For example, an average measured applied pressure of 200 N measured continuously or periodically (e.g., every 1, 5, or 10 s) over a 60 s time window would yield 12000 Ns. Similar considerations are set forth in Table I with respect to an Officer Levy ad Officer Johnson primary officers identified with via Levy and Johnson identifiers. Although Table I sets forth pressure values in Newtons and Newton seconds, in other embodiments, pressure values may be set forth in distance displacement (and distance displacement over time) or in electrical resistivity (and electrical resistivity over time) or conductivity (and electrical conductivity over time), among other possibilities dependent upon a type of pressure device used to measure and report pressure at each intelligent shield. As already set forth earlier, although Table I sets forth maximum pressure values against which pressure threshold rules may be applied, in other embodiments, Table I values may be modified to directly reflect the threshold values resultant after the rules are applied, among other possibilities.

At step 406, the electronic computing device determines whether any received pressure information from a particular primary officer (e.g., received directly or indirectly from the particular primary officer's intelligence shield) exceeds a globally applied corresponding threshold pressure value or a uniquely determined threshold pressure value for that particular primary officer and intelligent shield pair. Again referencing FIG. 5A and assuming that Smith referenced in Table I above is the second primary officer 515, as the crowd 132 begins to push against second primary officer 515 (in this case, Smith), an initial pressure sensor reading of 200 N may be received at the electronic computing device (perhaps after passing a projectile threshold period of time). The electronic computing device then compares the received pressure sensor reading to the retrieved maximum instantaneous pressure for Smith (800 N), and determines that the received pressure sensor information does not exceed a 90% (by rule) threshold of the maximum instantaneous pressure for Smith. As a result, processing would proceed from step 406 back to step 402, where the electronic computing device awaits additional increased pressure information and/or a longer passage of time to meet the time-based pressure threshold). The electronic computing device may store the received initial pressure sensor reading (associated with the primary officer and intelligent shield pair from which it was received) in order to further determine applied pressure over time and determine whether the max pressure over time is reached in the future, or may rely upon the intelligent shield and/or primary officer's mobile communication device to do so.

Assuming additional pressure sensor readings are received over subsequent executions of steps 402-406 or that such aggregated readings are subsequently provided by the intelligent shield and/or primary officer's mobile communication device, and that eventually one or both of greater than 90% of Johnson's maximum instantaneous pressure is reached or 90% of Johnson's maximum pressure over time is reached, the electronic computing device determines that the received pressure information exceeds the threshold pressure value for the particular primary officer and processing proceeds from step 406 to step 408.

Additional or alternative to the pressure information received, compared, and identified at steps 402-406, intelligent shield orientation information may be used as a further parameter in determining suitability for re-deploying secondary support officers to aid primary officers. The orientation information may similarly be saved in a local or remote storage, accompanying the pressure and location information, for subsequent access in re-creating pressure flows throughout the incident. For example, if a primary officer's intelligent shield, which should normally be held in an upright, 90° position relative to the ground, is detected to tilt more than 45° away from the initial 90° position (or some combination of orientation tilt along with pressure information), the electronic computing device may make similar receipt, comparison, and identification steps at steps 402-406 taking intelligent shield orientation into account, and perform same or similar compensation steps at steps 408-412.

At step 408, the electronic computing device identifies, via second location information provided via a plurality of secondary support officer and mobile radio computing device pairs, a particular secondary support officer to aid the particular primary officer identified at step 406. The second location information could be the same or similar to the first location information, and could be transmitted from each mobile radio computing device in each secondary support officer and mobile radio computing device pair. The second location information may be received at the electronic computing device via an infrastructure network such as RAN 152 of FIG. 1 or via one or more of a PAN, VAN, LAN, AHN, or DTN.

The second location information may be absolute or relative GPS coordinates of a current location of the secondary support officer and mobile radio computing device pair, or may represent a current backup formation position that may or may not correspond to the primary formation positions. For example, and with reference to FIG. 5A, second secondary support officer 525 and mobile radio computing device pair may transmit GPS coordinates to the electronic computing device representing a current geographical location of the second secondary support officer 525, or may transmit an electrical representation of its position within a secondary formation line consisting of all secondary support officers 522 (e.g., in this example position "2" being commensurate with position "2" of primary officer 515). Other possibilities exist as well.

Further at step 408, the electronic computing device then identifies the particular secondary support officer to aid the particular primary officer using the received first and second location information. In the example set forth in FIG. 5A, the electronic computing device executing process 400 may identify second secondary support officer 525 as being in a corresponding formation position ("2") as second primary officer 515, or may identify second secondary support officer 525 as having a closest GPS location to a GPS location of the second primary officer 515.

In still other embodiments, the intelligent shield or a mobile radio computing device associated with the primary officer and intelligent shield pair may perform a wireless short-range device discovery scan to identify all secondary support officer mobile radio computing devices within a short-range wireless scan of the primary officer and intelligent shield pair, and report the list of discovered secondary support officer mobile radio computing devices to the electronic computing device (perhaps accompanying measured signal strengths received from secondary support officer mobile radio computing devices during the discovery scan), allowing the electronic computing device to use such wireless discovery information and/or signal strength information as second location information to identify a particular secondary support officer to aid the particular primary officer. Other possibilities exist as well.

In some embodiments, the electronic computing device may also consider at step 408 physical characteristic information of the secondary support officers in order to ensure that a particular secondary support officer is identified at step 408 that is sufficient to compensate for the difference between the received pressure information and the threshold pressure value at step 406. A pressure support matrix same or similar to that set forth above in Table I may be provided for the secondary support officers. Depending on the difference between the received pressure information and the threshold pressure value at step 406, a particular secondary support officer that is farther away from the particular primary officer may be identified at step 408 if stored physical characteristics or pressure support information stored in the matrix for the farther away particular secondary support officer is better matched or simply higher than the closer secondary support officer. In the event that the difference between the received pressure information and the threshold pressure value at step 406 is high enough, and in some embodiments, two or more secondary support officers may be redeployed as shown in FIG. 5A (e.g., secondary support officers 525 and 526 moving to support primary officer 515).

Once a particular secondary support officer is identified at step 408, one or both of steps 410 and 412 may be executed. In the event that they are both executed, they may be executed serially or in parallel.

At step 410, the electronic computing device causes a redeployment message to be transmitted to the particular secondary support officer identified at step 408 (via the mobile radio computing device in the particular secondary support officer and mobile radio computing device pair) instructing the particular secondary support officer to aid the particular primary officer and including the location information associated with the particular primary officer and intelligent shield pair. The redeployment message may be a text message, an audio message, or a computer instruction to cause an alert to be displayed at the particular secondary support officer's mobile radio computing device. The contents of the redeployment message include the first location information associated with the first primary officer, which as set forth earlier, may include an absolute location (such as a GPS location) or a line formation position (e.g., within a line formation of the one or more primary officers), among other possibilities. The secondary support officer, once in receipt of the redeployment message and its included particular primary officer location information, can then move into a position behind the indicated particular primary officer and provide the requested additional support. For example, and as shown in FIG. 5A, second secondary support officer 525 may be instructed to move into position behind second primary officer 515 to support the second primary officer against pressure being applied by the crowd 132. The redeployment message at step 410 may be transmitted to the second secondary support officer 525 via an infrastructure network such as RAN 152 of FIG. 1 or via one or more of a PAN, VAN, LAN, AHN, or DTN.

At step 412, the electronic computing device causes an indication instruction to be transmitted to the intelligent shield or the mobile radio computing device associated with the particular primary officer, instructing the intelligent shield or mobile radio computing device to activate an externally perceivable indication to aid the particular secondary support officer in locating the particular primary officer and intelligent shield pair. The indication instruction may be transmitted to the intelligent shield or the mobile radio computing device associated with the particular primary officer via an infrastructure network such as RAN 152 of FIG. 1 or via one or more of a PAN, VAN, LAN, AHN, or DTN.

The externally-perceivable indication may comprise visible text on respective front and rear sides of the particular primary officer's clothing or the particular primary officer's intelligent shield, may comprise flashing lights communicably coupled to one of the intelligent shield and the particular primary officer's mobile communication device, or may comprise a speaker or horn that broadcasts an externally-perceivable audio output such as a public safety tone, series of tones, or spoken words that may direct the particular secondary support officer into location by the particular primary officer.

Externally-perceivable visible flashing lights may include an underlying LED, incandescent, or halogen lamp whose light output is modulated into a strobe, rotating, blinking, or otherwise non-static output, and may comprise a white or colored (e.g., red, blue, etc.) light. Externally-perceivable visible text may be enabled via embedded displays such as light-emitted diode (LED) displays or a liquid crystal display (LCD), mechanically movable rollsigns or mechanically movable coverings that allow backlights to shine through or ambient light to reflect to reveal the underlying text, light emitting phosphors that emit when an energy source such as radiation or electricity is applied, or any other type of switchable text display mechanism. Externally-perceivable speakers or horns may be a loudspeaker, an emergency tone generator, a siren, a car horn, or some other acoustic generating device that can generate and output a perceivable audio signal such as a tone, music, speech, or other type of audio.

As a part of one or both of steps 410 and 412, the electronic computing device may modify the maximum instantaneous pressure and/or maximum pressure over time values maintained for the particular primary officer and may raise the corresponding values of the maximum instantaneous pressure and/or maximum pressure over time values maintained for the primary officer, using a pre-determined static amount (such as by 50%, or by 75%) or by variable amount dependent upon the physical characteristics of the secondary support officer or the stored maximum pressure values associated with the particular secondary support officer, in response to the instruction to provide such support. As a result, if further additional pressure is applied to the particular primary officer beyond that of the maximum of the particular primary officer and particular secondary support officer combined, an additional second secondary support officer (a third officer) may be further redeployed to support the particular primary officer in subsequent executions of steps 402-412.

Additionally, once the pressure detected on the particular primary officer is removed and/or falls back below a pressure threshold associated with the particular primary officer's maximum instantaneous and/or time-based pressure, the particular secondary support officer that was previously redeployed to support the particular primary officer may be called off and redeployed elsewhere, perhaps to somewhere that the crowd has moved. For example, and as shown in FIG. 5B, second secondary support officer 525 may be redeployed to aid fourth primary officer 517 as the crowd 132 moves and third secondary support officer 526 may be redeployed back to his or her initial position to await further instructions.

Furthermore, a recording instruction may be transmitted at one or both of steps 410 and 412 to the intelligent shield or mobile radio computing device of the particular primary officer instructing an imaging device integrated in the intelligent shield or mobile radio computing device or coupled to a body of the particular primary officer (and communicably coupled to the intelligent shield or mobile radio computing device) to begin recording images or video in response to the determination at step 406. The recording instruction may be transmitted to the intelligent shield or the mobile radio computing device associated with the particular primary officer via an infrastructure network such as RAN 152 of FIG. 1 or via one or more of a PAN, VAN, LAN, AHN, or DTN.

Video and/or images recorded at the particular primary officer may then be transmitted (by the intelligent shield itself, the imaging device itself, or the mobile radio computing device) back to the electronic computing device, to other/all secondary support officers, and/or a dispatch console 158 for further processing or analysis.

Finally, and again as a part of one or both of steps 410 and 412, the electronic computing device may access (or transmit a control message to) a controller associated with an infrastructure network (e.g., radio controller, call controller, PTT server, zone controller, MME, BSC, MSC, site controller, Push-to-Talk controller, or other network device)

such as controller 156 of RAN 152 in FIG. 1, and instruct the controller to elevate a voice or data channel access priority associated with one or both of the particular primary officer (e.g., the particular primary officer's intelligent shield or corresponding mobile radio computing device) and the particular secondary support officer (e.g., the secondary support officer's mobile radio computing device) in order to ensure that both officers have elevated channel access privileges given the detected situation.

3. CONCLUSION

In accordance with the foregoing, an improved method, device, and system for managing a formation of electronically-embedded intelligent shields is disclosed. As a result of the foregoing, a formation line of primary officers with intelligent shields can be more intelligently maintained using electronically monitored pressure points, and weaknesses in the line identified more quickly and remedied more quickly via automatic electronic identification and dispatch of secondary support officers, resulting in increased safety for both the formation line officers and property or people that are behind the formation line. Other advantages and benefits are possible as well.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized electronic processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising an electronic processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for managing a formation of intelligent electronically-embedded intelligent shields, the method comprising:
receiving, at a computing device, from each of a plurality of primary officer and intelligent shield pairs, first location information associated with the primary officer and intelligent shield pair and pressure information measured at a pressure sensor coupled to the intelligent shield and indicative of a pressure being applied to a front and/or rear face of the intelligent shield;
comparing, by the computing device and for each of the primary officer and intelligent shield pairs, received pressure information to a threshold pressure value stored at the computing device and identifying, by the computing device as a result of the comparing, a particular primary officer and intelligent shield pair providing a particular received pressure information exceeding the threshold pressure value, and responsively:

identifying, by the computing device via second location information provided via a plurality of secondary support officer and mobile radio computing device pairs, a particular secondary support officer to aid the particular primary officer; and     one or both of (i) causing, by the computing device, a redeployment message to be transmitted to the particular secondary support officer via a particular mobile radio computing device paired with the particular secondary support officer instructing the particular secondary support officer to aid the particular primary officer and including the first location information associated with the particular primary officer, and (ii) causing, by the computing device, an indication instruction to be transmitted to the intelligent shield in the particular primary officer and intelligent shield pair instructing the intelligent shield to activate an externally perceivable indication to aid the particular secondary support officer in locating a location of the primary officer and intelligent shield pair.

2. The method of claim 1, wherein the first location information associated with the particular primary officer and intelligent shield pair is global positioning system (GPS) coordinates of the particular primary officer and intelligent shield pair.

3. The method of claim 1, wherein the first location information associated with the primary officer and intelligent shield pair is a formation position indication indicating a position of the primary officer and intelligent shield pair within a formation formed by the plurality of primary officer and intelligent shield pairs.

4. The method of claim 1, wherein the threshold pressure value stored at the computing device is a predetermined value applied to each of the primary officer and intelligent shield pairs.

5. The method of claim 1, wherein the threshold pressure value stored at the computing device varies for each primary officer and intelligent shield pair out of the primary officer and intelligent shield pairs as a function of determined characteristics of one or both of the intelligent shield and the primary officer in the primary intelligent shield and primary officer pair.

6. The method of claim 5, wherein the threshold pressure value stored at the computing device varies for each primary officer and intelligent shield pair out of the primary officer and intelligent shield pairs as a function of determined characteristics of the primary officer in the primary intelligent shield and primary officer pair, the determined characteristics of the primary officer in the primary intelligent shield and primary officer pair including one or more of a height, weight, and health history of the primary officer.

7. The method of claim 5, wherein the threshold pressure value stored at the computing device varies for each primary officer and intelligent shield pair out of the primary officer and intelligent shield pairs as a function of determined characteristics of the intelligent shield in the primary intelligent shield and primary officer pair, the determined characteristics of the intelligent shield including one or more of a material of the intelligent shield, a type of the pressure sensor, a location of the pressure sensor on the intelligent shield, and an orientation of the intelligent shield.

8. The method of claim 1, wherein the method comprises causing, by the computing device, the redeployment message to be transmitted to the particular secondary support officer via a particular mobile radio computing device paired with the particular secondary support officer instructing the particular secondary support officer to aid the particular primary officer and including the first location information associated with the particular primary officer.

9. The method of claim 8, wherein the step of identifying the particular secondary support officer comprises identifying the particular secondary support officer, as a function of the second location information, having a closest location to a first location of the particular primary officer.

10. The method of claim 8, wherein the step of identifying the particular secondary support officer comprises identifying the particular secondary support officer, as a function of short-range device scan information received from one of the particular primary intelligent shield in the particular primary officer and intelligent shield pair and a mobile radio computing device associated with the particular primary officer in the first particular primary officer and intelligent shield pair, out of one or more available secondary support officer and mobile radio computing device pairs identified in the short-range device scan information.

11. The method of claim 8, wherein the step of identifying the particular secondary support officer comprises identifying the particular secondary support officer, as a function of stored physical characteristic information associated with each of the plurality of the secondary support officers, sufficient to compensate for a difference between the particular received pressure information and the threshold pressure value.

12. The method of claim 8, wherein the redeployment message is caused to be transmitted to the particular secondary support officer via a personal area network (PAN), vehicle area network (VAN), local area network (LAN), ad-hoc network (AHN), or disruption tolerant network (DTN).

13. The method of claim 8, wherein the redeployment message is caused to be transmitted to the particular secondary support officer via an infrastructure network.

14. The method of claim 1, wherein the method comprises causing, by the computing device, an instruction to be transmitted to the particular primary intelligent shield in the particular primary officer and intelligent shield pair instructing the particular primary intelligent shield to activate an externally perceivable indication to aid the particular secondary support officer in locating a location of the particular primary officer and intelligent shield pair.

15. The method of claim 14, wherein the externally perceivable indication is one of a visual light source having a particular color associated with a request for support due to a threshold level of pressure being exceeded, and a particular audio tone having a particular tone, pitch, or frequency associated with a request for support due to a threshold level of pressure being exceeded.

16. The method of claim 1, further comprising causing, by the computing device, a voice channel access priority of mobile radios associated with one or both of the particular primary officer and the particular secondary support officer to be increased.

17. The method of claim 1, wherein the particular secondary support officer is a second particular primary officer and intelligent shield pair from one of the plurality of primary officer and intelligent shield pairs that reports a lack of any pressure applied to the second particular primary intelligent shield of the second particular primary officer and intelligent shield pair over a threshold period of time.

18. The method of claim 1, the method further comprising receiving, at the computing device, orientation information from each of the plurality of primary officer and intelligent shield pairs indicating a current orientation of the intelligent shield in each corresponding primary officer and intelligent shield pair;

comparing, by the computing device and for each of the primary officer and intelligent shield pairs, orientation information to a non-desirable orientation value range stored at the computing device and identifying, by the computing device as a result of the comparing, a second particular primary officer and intelligent shield pair providing a particular orientation information falling within the non-desirable orientation value range, and alone or in combination with pressure information associated with the intelligent shield of the second particular primary officer and intelligent shield pair, responsively:

identifying, by the computing device via the second location information provided via the plurality of secondary support officer and mobile radio computing device pairs, a second particular secondary support officer to aid the second particular primary officer; and         one of (i) causing, by the computing device, a redeployment message to be transmitted to the second particular secondary support officer via a particular mobile radio computing device paired with the second particular secondary support officer instructing the second particular secondary support officer to aid the second particular primary officer and including location information associated with the second particular primary officer and (ii) causing, by the computing device, an indication instruction to be transmitted to the intelligent shield in the second particular primary officer and intelligent shield pair instructing the intelligent shield to activate an externally perceivable indication to aid the second particular secondary support officer in locating a location of the second primary officer and intelligent shield pair.

19. The method of claim 1, the method further comprising the computing device causing an image capture device deployed at the intelligent shield in the particular primary officer and intelligent shield pair to be activated and the computing device subsequently receiving an image or video stream from the intelligent shield in the particular primary officer and intelligent shield pair.

20. A computing device for triggering and propagating of a covert mode status change, the computing device comprising:

one or more transceivers;
    a data store; and
    one or more electronic processors configured to:

receive, via the one or more transceivers, from each of a plurality of primary officer and intelligent shield pairs, first location information associated with the primary officer and intelligent shield pair and pressure information measured at a pressure sensor coupled to the intelligent shield and indicative of a pressure being applied to a front and/or rear face of the intelligent shield;

compare, for each of the primary officer and intelligent shield pairs, received pressure information to a threshold pressure value stored at the computing device and identifying, by the computing device as a result of the comparing, a particular primary officer and intelligent shield pair providing a particular received pressure information exceeding the threshold pressure value, and responsively:

identify, via second location information provided via a plurality of secondary support officer and mobile radio computing device pairs, a particular secondary support officer to aid the particular primary officer; and         one or both of (i) cause a redeployment message to be transmitted, via the one or more transceivers, to the particular secondary support officer via a particular mobile radio computing device paired with the particular secondary support officer instructing the particular secondary support officer to aid the particular primary officer and including the first location information associated with the particular primary officer, and (ii) cause, via the one or more transceivers, an indication instruction to be transmitted to the intelligent shield in the particular primary officer and intelligent shield pair instructing the intelligent shield to activate an externally perceivable indication to aid the particular secondary support officer in locating a location of the primary officer and intelligent shield pair.

\* \* \* \* \*